United States Patent
Childress et al.

(10) Patent No.: US 10,623,389 B2
(45) Date of Patent: Apr. 14, 2020

(54) AUTHENTICATING A DEVICE BASED ON COMMUNICATION PATTERNS IN A GROUP OF DEVICES

(71) Applicant: International Business Machines Corporation, Armonk, NY (US)

(72) Inventors: Rhonda L. Childress, Austin, TX (US); Rahul Gupta, Austin, TX (US); Hari H. Madduri, Austin, TX (US); Maharaj Mukherjee, Poughkeepsie, NY (US); Joanna W. Ng, Ontario (CA)

(73) Assignee: International Business Machines Corporation, Armonk, NY (US)

( * ) Notice: Subject to any disclaimer, the term of this patent is extended or adjusted under 35 U.S.C. 154(b) by 38 days.

(21) Appl. No.: 15/593,164

(22) Filed: May 11, 2017

(65) Prior Publication Data

US 2018/0332017 A1    Nov. 15, 2018

(51) Int. Cl.
    *H04L 29/06*    (2006.01)

(52) U.S. Cl.
    CPC .......... *H04L 63/08* (2013.01); *H04L 63/1425* (2013.01)

(58) Field of Classification Search
    CPC ...... H04L 63/08; H04L 63/10; H04L 63/1425
    See application file for complete search history.

(56) References Cited

U.S. PATENT DOCUMENTS

| | | | | |
|---|---|---|---|---|
| 6,496,979 B1 * | 12/2002 | Chen | .......................... | G06F 8/61 717/178 |
| 8,423,687 B2 * | 4/2013 | Srinivansan, Sr. | .... | G06Q 10/10 701/1 |
| 8,869,235 B2 * | 10/2014 | Qureshi | .................. | G06F 21/10 726/1 |
| 8,874,162 B2 * | 10/2014 | Schrader | ............... | H04W 12/08 455/550.1 |
| 9,100,829 B2 * | 8/2015 | Lee | ......................... | G06F 21/51 |
| 9,110,732 B1 * | 8/2015 | Forschmiedt | ....... | G06F 9/44505 |

(Continued)

FOREIGN PATENT DOCUMENTS

| | | |
|---|---|---|
| CN | 102036231 | 4/2011 |
| DE | 4339460 | 4/1995 |

OTHER PUBLICATIONS

Atzori et al., "Slot: Giving a Social Structure to the Internet of Things", IEEE Communications Letters, vol. 15., No. 11, Nov. 2011, Total 3 pages.

(Continued)

*Primary Examiner* — Mohammed Waliullah
(74) *Attorney, Agent, or Firm* — Janaki K. Davda; Konrad, Raynes, Davda and Victor LLP

(57) ABSTRACT

Provided are techniques for authenticating a device. Accepted communication patterns representing accepted modes of communication between devices in an internet of things network are stored. In response to receiving a new communication from a requesting device of the devices, it is determined whether the new communication matches at least one of the accepted communication patterns. In response to determining that the new communication matches, there is a response to the new communication. In response to determining that the new communication does not match, flagging the new communication as an anomaly and determining how to process the new communication based on the flagging.

20 Claims, 9 Drawing Sheets

(56) References Cited

U.S. PATENT DOCUMENTS

| | | | |
|---|---|---|---|
| 9,112,749 B2* | 8/2015 | Dabbiere | H04L 29/08 |
| 9,185,099 B2* | 11/2015 | Brannon | H04L 63/08 |
| 9,307,451 B1* | 4/2016 | Kodeswaran | H04W 12/08 |
| 9,578,188 B1* | 2/2017 | Kircher | H04N 1/00244 |
| 9,602,508 B1* | 3/2017 | Mahaffey | H04L 63/0869 |
| 9,608,809 B1* | 3/2017 | Ghetti | H04L 9/083 |
| 9,635,014 B2* | 4/2017 | Venkataraman | H04L 63/0823 |
| 9,665,702 B2* | 5/2017 | King | G06F 21/31 |
| 9,672,338 B1* | 6/2017 | Kim | H04W 12/08 |
| 9,710,649 B2* | 7/2017 | Da Palma | G06F 21/57 |
| 9,917,862 B2* | 3/2018 | Phanse | H04L 63/20 |
| 2006/0248573 A1 | 11/2006 | Pannu et al. | |
| 2007/0078944 A1* | 4/2007 | Charlebois | H04N 21/235 709/217 |
| 2008/0086777 A1* | 4/2008 | Sanchez | G06F 21/121 726/26 |
| 2008/0263511 A1* | 10/2008 | Shapiro | G06F 8/61 717/104 |
| 2011/0023123 A1* | 1/2011 | King | G06F 21/105 726/26 |
| 2011/0065419 A1* | 3/2011 | Book | G06F 21/305 455/411 |
| 2012/0084184 A1* | 4/2012 | Raleigh | H04L 12/5691 705/30 |
| 2012/0129503 A1* | 5/2012 | Lindeman | H04L 67/34 455/414.1 |
| 2012/0216242 A1* | 8/2012 | Uner | G06F 21/50 726/1 |
| 2012/0291102 A1* | 11/2012 | Cohen | G06F 21/57 726/4 |
| 2012/0309464 A1* | 12/2012 | Lim | H04M 1/72522 455/566 |
| 2013/0007245 A1* | 1/2013 | Malik | H04L 41/0816 709/223 |
| 2013/0080522 A1* | 3/2013 | Ren | H04L 12/6418 709/204 |
| 2014/0033315 A1* | 1/2014 | Biswas | G06F 21/105 726/26 |
| 2014/0040977 A1* | 2/2014 | Barton | H04L 63/20 726/1 |
| 2014/0068755 A1* | 3/2014 | King | G06F 21/53 726/19 |
| 2014/0181959 A1* | 6/2014 | Li | G06F 21/32 726/19 |
| 2014/0215590 A1* | 7/2014 | Brand | H04L 67/1097 726/6 |
| 2014/0244834 A1 | 8/2014 | Guedalia et al. | |
| 2014/0250145 A1* | 9/2014 | Jones | G06Q 10/101 707/769 |
| 2014/0280934 A1* | 9/2014 | Reagan | H04L 47/70 709/225 |
| 2014/0282610 A1* | 9/2014 | Strom | G06F 21/00 719/313 |
| 2014/0282822 A1 | 9/2014 | Dunne et al. | |
| 2014/0337528 A1* | 11/2014 | Barton | H04L 41/00 709/225 |
| 2015/0007273 A1 | 1/2015 | Lin | |
| 2015/0019714 A1 | 1/2015 | Shaashua et al. | |
| 2015/0032655 A1* | 1/2015 | Said | G06Q 10/1053 705/321 |
| 2015/0135277 A1 | 5/2015 | Vij et al. | |
| 2015/0150130 A1* | 5/2015 | Fiala | G06F 21/56 726/23 |
| 2015/0207809 A1* | 7/2015 | MacAulay | G06F 21/552 726/22 |
| 2015/0215772 A1* | 7/2015 | Gattu | H04W 8/245 455/418 |
| 2015/0237071 A1 | 8/2015 | Maher et al. | |
| 2015/0244743 A1* | 8/2015 | Jagad | G06F 21/577 726/1 |
| 2015/0249617 A1* | 9/2015 | Chang | H04L 47/70 709/225 |
| 2015/0269383 A1 | 9/2015 | Lang et al. | |
| 2015/0319252 A1* | 11/2015 | Momchilov | H04L 67/141 709/223 |
| 2015/0358332 A1 | 12/2015 | Glickfield et al. | |
| 2015/0373023 A1* | 12/2015 | Walker | H04L 63/10 726/3 |
| 2016/0087956 A1* | 3/2016 | Maheshwari | G06F 8/60 726/6 |
| 2016/0094560 A1* | 3/2016 | Stuntebeck | H04L 63/102 726/1 |
| 2016/0112260 A1* | 4/2016 | Pai | H04L 67/141 709/222 |
| 2016/0156596 A1 | 6/2016 | Chen | |
| 2016/0188307 A1* | 6/2016 | Reagan | G06F 8/61 717/177 |
| 2016/0205106 A1 | 7/2016 | Yacoub et al. | |
| 2016/0212099 A1 | 7/2016 | Zou et al. | |
| 2016/0259924 A1 | 9/2016 | Dutt et al. | |
| 2016/0261621 A1 | 9/2016 | Srivastava et al. | |
| 2016/0269436 A1 | 9/2016 | Danielson et al. | |
| 2016/0284035 A1* | 9/2016 | Muttik | G06Q 50/18 |
| 2016/0301707 A1 | 10/2016 | Cheng et al. | |
| 2016/0373431 A1* | 12/2016 | Van Den Broeck | H04L 63/083 |
| 2017/0048251 A1* | 2/2017 | Guday | H04W 12/08 |
| 2017/0094509 A1* | 3/2017 | Mistry | H04L 63/083 |
| 2017/0111247 A1* | 4/2017 | Uchiyama | H04L 43/0805 |
| 2017/0238753 A1* | 8/2017 | Merali | A47J 31/52 |

OTHER PUBLICATIONS

Bao et al., "Trust Management for the Internet of Things and Its Application to Service Composition", dated 2012, World of Wireless, Mobile and Multimedia Networks (WoWMoM), 2012 IEEE International Symposium, Total 6 pages.

Copigneaux et al.,"Semi-Autonomous, Context-Aware, Agent Using Behaviour Modelling and Reputation Systems to Authorize Data Operation in the Internet of Things", Internet of Things (WF-IoT), 2014 IEEE World Forum, dated 2014, Total 6 pages.

Kopetz, H., Real-Time System Series, Chaper 13, Internet of Things, dated 2011, Total 17 pages.

Li, "Study on Security Architecture in the Internet of Things", dated 2012, International Conference on Measurement, Information and Control (MIC), Total 4 pages.

Mell et al.,"Effectively and Securely Using the Cloud Computing Paradigm", dated Oct. 7, 2009, NIST Cloud Computing Resources, Total 80 pages.

Mell et al., "The NIST Definition of Cloud Computing", dated Sep. 2011, Recommendations of the National Institute of Standards and Technology, Computer Security Division Information Technology Laboratory National Institute of Standards and Technology, Total 7 pages.

Miettinen, et al., "Poster: Friend or Foe? Context Authentication for Trust Domain Separation in IoT Environments", dated 2016, Proceedings of the 9th ACM Conference on Security & Privacy in Wireless and Mobile Networks, Total 2 pages.

Nitti et al., "Friendship Selection in the Social Internet of Things: Challenges and Possible Strategies" dated 2015, IEEE Internet of Things Journal, Total 8 pages.

Tormo et al., "Dynamic and Flexible Selection of a Reputation Mechanism for Heterogeneous Environments", dated 2015, Future Generation Computer Systems, Total 12 pages.

Xiao et al., "Guarantor and Reputation Based Trust Model for Social Internet of Things", dated 2015, International Wireless Communications and Mobile,School of Computer Science University of Hertfordshire, Total 6 pages.

Yan et al., "TruSMS : A Trustworthy SMS Spam Control System Based on Trust Management" dated Jul. 2014, Journal of Network and Computer Applications, Total 17 pages.

"Identity and Access Management for the iot", IoT Working Group, 2016, (Available at: URL https://downloads.cloudsecurityalliance.org/assets/research/internet-of-things/identity-and-access-management-for-the-iot.pdf), Total 14 pages.

(56) References Cited

OTHER PUBLICATIONS

"Securing the Internet of Things: A Proposed Framework" dated Jan. 31, 2017, (online) retrieved from the Internet at URL http://www.cisco.com/c/en/us/about/security-center/secure-iot-proposed-framework.html,Total 9 pages.
"Authentication Controlling Access to Complex Networks", Infineon Technologies, Semiconductor and System Solutions, May 10, 2017, (Available at: URL http://www.infineon.com/cms/en/applications/chip-card-security/internet-of-things-security/authentication/) Total 10 pages.
Myrick, A. "Google aims to get rid of passwords to replace them with 'trust scores'", dated May 24, 2016, (online), retrieved from the Internet at URL http://phandroid.com/2016/05/24/google-trust-score-passwords/, Total 3 pages.
US Patent Application, dated May 11, 2017, for U.S. Appl. No. 15/593,154, filed May 11, 2017, invented by Rahul Gupta et al., Total 38 pages.
List of IBM Patents or Patent Applications Treated as Related, pp. 2, dated May 11, 2017.
Office Action, dated Jan. 24, 2019, for U.S. Appl. No. 15/593,154, filed May 11, 2017, invented by Rahul Gupta et al., Total 54 pages.
Response to Office Action, dated Apr. 23, 2019, for U.S. Appl. No. 15/593,154, filed May 11, 2017, invented by Rahul Gupta at al., Total 18 pages.
Final Office Action, dated Jul. 17, 2019, for U.S. Appl. No. 15/593,154, filed May 11, 2017, invented by Rahul Gupta et al., Total 73 pages.
Response to Final Office Action, dated Oct. 17, 2019, for U.S. Appl. No. 15/593,154, filed May 11, 2017, invented by Rahul Gupta et al., Total 15 pages.
Office Action3, dated Oct. 30, 2019, for U.S. Appl. No. 15/593,154, filed May 11, 2017, invented by Rahul Gupta et al., Total 55 pages.
Response to Office Action, dated Jan. 28, 2020, for U.S. Appl. No. 15/593,154, filed May 11, 2017, Total 15 pages.

\* cited by examiner

AUTHENTICATING A DEVICE BASED ON COMMUNICATION PATTERNS IN A GROUP OF DEVICES

BACKGROUND

Embodiments of the invention relate to authenticating a device (e.g., an unknown device) based on communication patterns in a group of devices. The devices may be Internet of Things (IoT) devices The Internet of Things (IoT) may be described as a group of devices that are connected to the Internet and communicate with each other and/or the rest of the internet. Each of the devices typically has electronics and software to enable that device to collect information and communicate that information with other devices. For example, a device may have a sensor to receive, as well as, track information.

A problem in IOT inter-device communication is establishing the identity of a first device that is requesting the access of a second device. Sometimes the accessing, first device is part of the same cluster of devices as the second device. Sometimes the accessing, first device is located in the same physical network as the second device. In other cases, the accessing, first device may be somewhere in the network and establishing its identity may be difficult. In yet other cases, the accessing, first device may infect one of the known devices and may try to access another device either pretending to be a known device or piggybacking on a known device to access that other device.

However, allowing an unauthenticated device to have access to data of another device may have implications on the system, such as unauthorized access of the data, system to system failure, takeover of a device by a malicious intruder (e.g., the unauthenticated device), etc.

SUMMARY

Provided is a method for authenticating a device based on communication patterns. The method comprises: storing accepted communication patterns representing accepted modes of communication between devices in an internet of things network; and, in response to receiving a new communication from a requesting device of the devices, determining whether the new communication matches at least one of the accepted communication patterns; in response to determining that the new communication matches, responding to the new communication; and in response to determining that the new communication does not match, flagging the new communication as an anomaly and determining how to process the new communication based on the flagging.

Provided is a computer program product for authenticating a device based on communication patterns. The computer program product comprises a computer readable storage medium having program code embodied therewith, the program code executable by at least one processor to perform: storing accepted communication patterns representing accepted modes of communication between devices in an internet of things network; and, in response to receiving a new communication from a requesting device of the devices, determining whether the new communication matches at least one of the accepted communication patterns; in response to determining that the new communication matches, responding to the new communication; and in response to determining that the new communication does not match, flagging the new communication as an anomaly and determining how to process the new communication based on the flagging.

Provided is a computer system for authenticating a device based on communication patterns. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations comprising: storing accepted communication patterns representing accepted modes of communication between devices in an internet of things network; and, in response to receiving a new communication from a requesting device of the devices, determining whether the new communication matches at least one of the accepted communication patterns; in response to determining that the new communication matches, responding to the new communication; and in response to determining that the new communication does not match, flagging the new communication as an anomaly and determining how to process the new communication based on the flagging.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
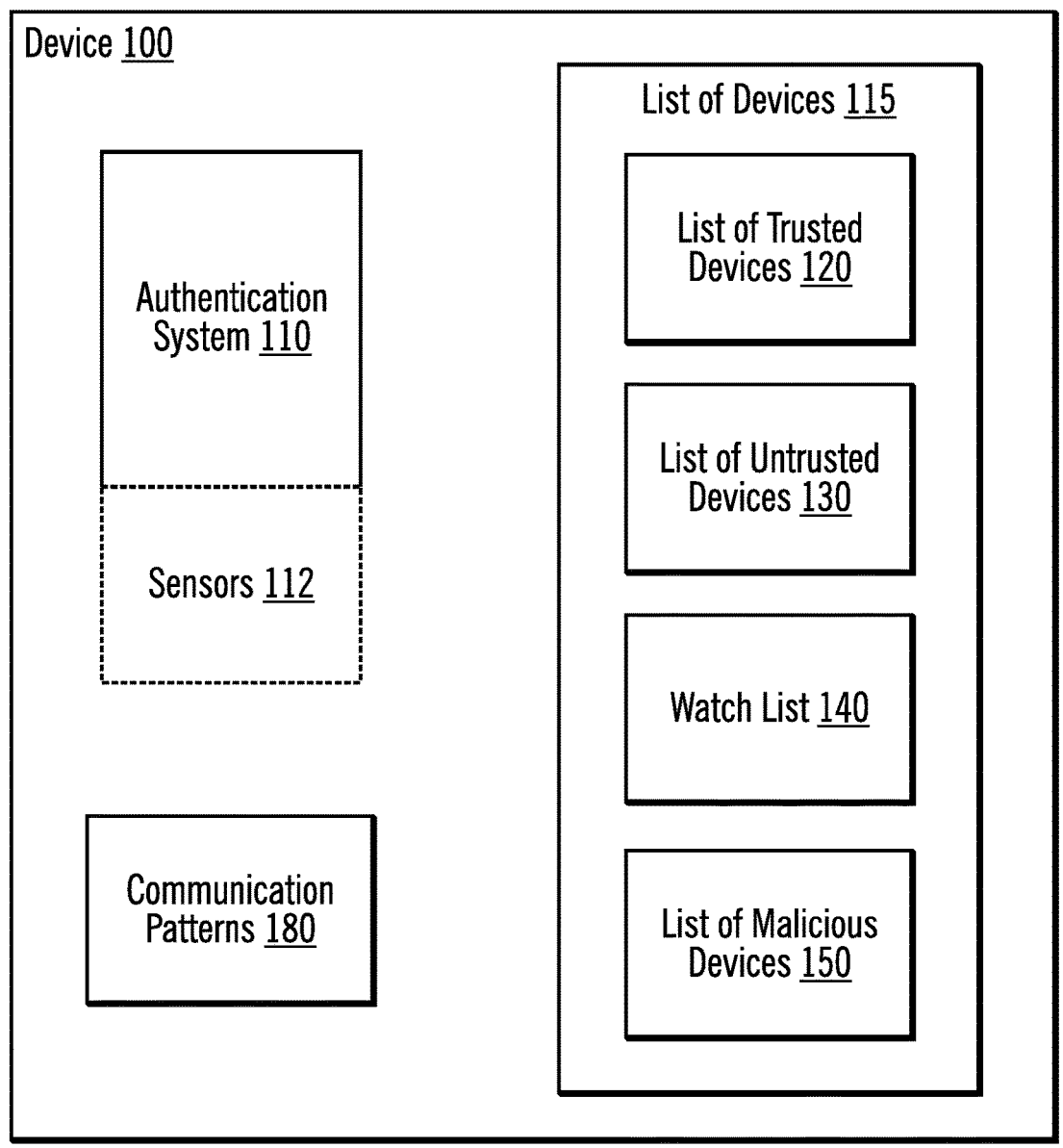
FIG. 1 illustrates, in a block diagram, a computing environment in accordance with certain embodiments.

FIG. 1 illustrates, in a block diagram, a computing environment in accordance with certain embodiments. A device 100 includes an authentication system 110, lists of devices 115, and communication patterns 180. The lists of devices 115 may include a list of trusted devices 120, a list of untrusted devices 130, a watch list 140, and a list of malicious devices 150. A requesting device is a device that is making a request to a receiving device. The receiving device receives the request. With embodiments, the authentication system 110 includes sensors 112 to receive and track information. In other embodiments, the sensors are separate from the authentication system 110, and the authentication system 110 receives information from the sensors 112. The communication patterns 180 may be described as patterns of behavior between devices.

A communication pattern may have several features of: who, what, when, where, how, etc. Examples of these features are a) which devices are communicating, b) what is the type of communication (e.g., information, alert, event, message, etc.), c) when is the communication being sent d) how long does it take for the communication to be sent from the sender to the receiver (i.e., duration), e) how often is the communication sent (i.e., frequency), f) what is the mode of communication (such as one-to-one, many-to-one, one-to-many, broadcast, etc.), g) what is the topology, and other features. With embodiments, a communication pattern consists of a set of features that are found repeatedly among communications.

With embodiments, the topology may include an indication of whether the communication is in a circle pattern of devices, a chain pattern of devices, a Y pattern of devices, a wheel pattern of devices, a star pattern of devices, etc.

With embodiments, the authentication system 110 classifies a requesting device by classifying that requesting device as a category of a trusted device, a category of an untrusted device or an unknown device. The unknown device may be newly added to a network and so was not previously known to a receiving device.

With embodiments, the possible relationships include the following with the following hierarchy in terms of level of trust: family, friends, acquaintances, followers, following, unknown, risky, threats, foes, enemies, rogues.

With embodiments, the list of trusted devices identifies a group of devices that are known to the receiving device and that are trusted. With embodiments, the list of trusted devices include the following categories of relationships having the following hierarchy in terms of level of trust: family, friend, acquaintance, follower, and following. With embodiments, family devices are the most trusted in the hierarchy.

Family devices may be described as a group of devices that are connected together to solve a particular function. For example, a thermostat, a light control device, an occupancy detection device, a motion detection device, and a Heating, Ventilation, and Air Conditioning (HVAC) unit may work together to make a particular room or office comfortable for the occupant.

Friend devices may be described as a group of devices that may not work as closely as family devices, but which exchange information on a regular basis.

Acquaintance devices may be described as a group of devices that are not as close as family or friend devices, but still may exchange information. For example, a group of thermostats in different households may not be strongly connected, and yet they may exchange information related to optimal settings for the neighborhood or any anomaly or malicious attack on any devices.

Follower devices may be described as devices that get information from another device on a view or read only basis, without any write or edit permission. For example, a thermostat may get regular data from a weather station device, but the weather station device does not get data from the thermostat.

Following devices may be described as devices that provide information to another device on a view or read only basis. For example, the weather station device provides information to the thermostat.

With embodiments, the list of untrusted devices identifies a group of device that are that are untrusted (e.g., known to be a set of rogue devices). With embodiments, the list of untrusted devices include the following categories of relationships having the following hierarchy in terms of level of trust: risky, threat, foe, enemy, rogue. With embodiments, rogue device is the least trusted in the hierarchy.

A risky device may be described as a device that does not comply with existing security guidelines and may become a threat device. Such a risky device is added to a watch list, optionally with warnings. For example, a device may maintain a record of how it is perceived by other devices. A warning is a negative score in that regard. If a device accumulates enough negative scores, the device may be considered to be a threat device. Also, if a risky device is seen to have been communicating with a higher category of foe devices, the risky device's perceived risk level increases and may be considered to be a threat device. Any device categorized as a risky device by any friend device is considered risky.

A threat device may be described as a device that was a risky device once and may have been maliciously infected or is in communication with other devices of the untrusted category. Any device categorized as a threat device by any friend device is considered risky. For example, if a risky device is determined to have been communicating with a higher category of untrusted devices, the risky device's perceived risk level increases and that device may be considered as a threat device.

A foe device may be described as a device that may be (by its own intent or by being part of an untrusted (e.g., foe) circle of devices) trying to do harm to a trusted (e.g., friend) circle of devices. Any device categorized as a foe device by any friend device is considered risky.

Enemies may be described as a collection of foe devices that cluster together to do harm to a trusted (e.g., friend) circle of devices.

Rogues devices may be described as a set of device whose impact is felt beyond the trusted (e.g., friend) circle of devices.

With embodiments, no communication is allowed for untrusted devices or any subset of untrusted devices (e.g., devices that are considered to be: threat, foe, enemy or rogue).

With embodiments, all trusted devices or any subset (e.g., friends, friends and family, etc.) of trusted devices may be said to form a trusted circle. With embodiments, all untrusted devices or any subset (e.g., foes, foes and enemy, etc.) of untrusted devices may be said to form an untrusted circle.

When an unknown requesting device makes a request to connect to a receiving device, the authentication system 110 of the receiving device attempts to determine whether the requesting device is a trusted (e.g., friend) device or an untrusted (e.g., foe) device based on the unknown requesting device's social reputation among a trusted circle of devices of the receiving device.

With the list of untrusted devices, when a device falters in keeping the trust of other devices, the authentication system 110 verifies whether this was intentional or whether this device is perceived as one of the untrusted categories of: risky, threats, foes, enemies, and rogues.

With embodiments, the authentication system 110 identifies trusted (e.g., friend) devices and untrusted (e.g., rogue) devices through identifying and authenticating IoT devices based on trusted devices or devices with which a particular device mostly communicates with. Such communications form the communication patterns 180. With embodiments, a communication pattern indicates one or more features of: which devices are communicating, what the devices are communicating (i.e., the type of communication), when the devices are communicating, duration, frequency, mode, topology, and where the devices are located.

Figure 2:
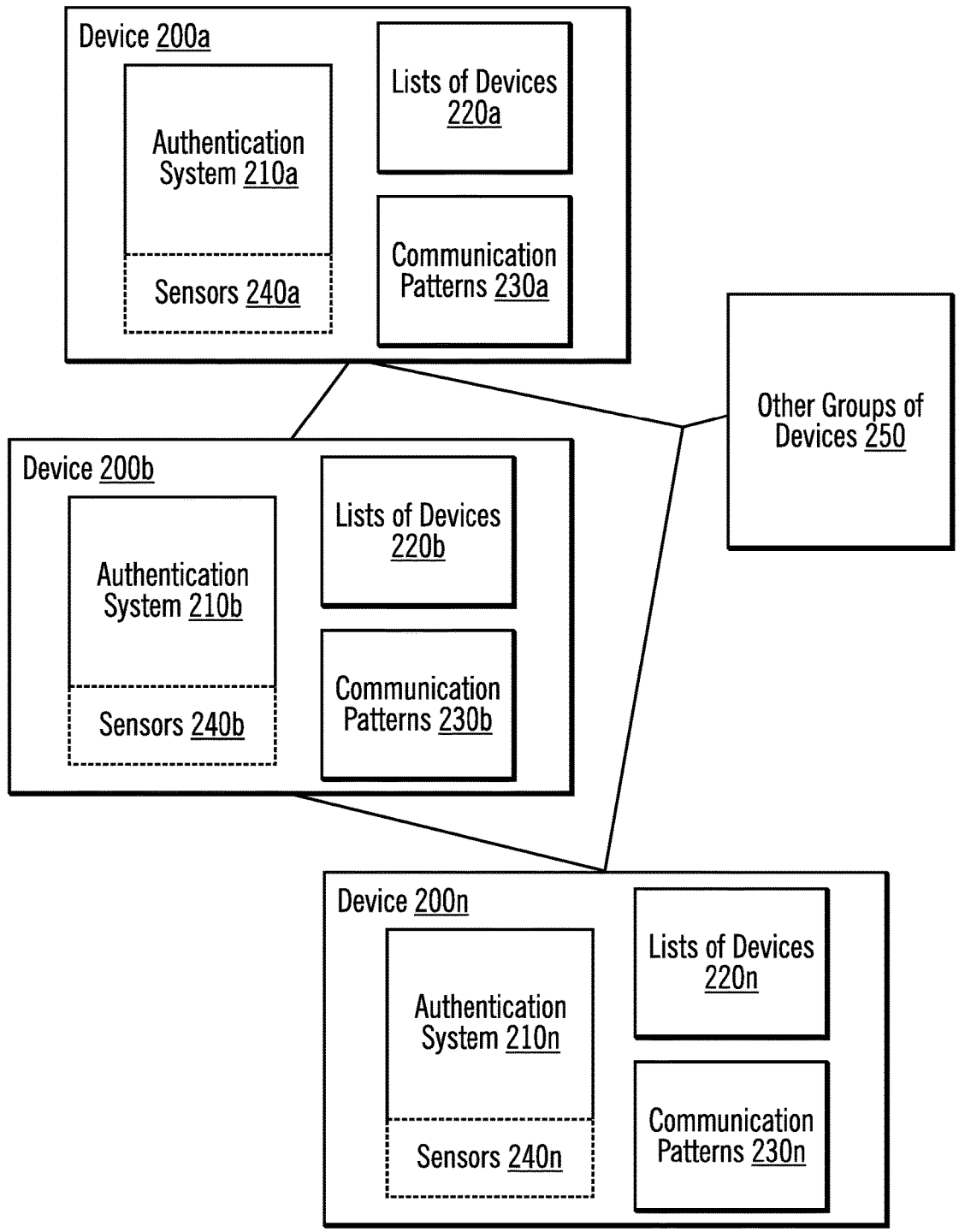
FIG. 2 illustrates a group of devices in accordance with certain embodiments.

FIG. 2 illustrates a group of devices in accordance with certain embodiments. The group of devices includes devices 200a., 200b . . . 200n. Each device 200a., 200b . . . 200n in the group of devices is coupled to each of the other devices 200a., 200b . . . 200n via a network, such as the Internet, an intranet, etc. Moreover, the group of devices 200a., 200b . . . 200n may be coupled to other groups of devices 250. Each of the devices 200a., 200b . . . 200n includes an authentication system, lists of devices (such as the lists of devices shown in FIG. 1), communication patterns, and sensors. For example, device 200a includes an authentication system 210a, lists of devices 220a, communication patterns 230a, and sensors 240a; device 200b includes an authentication system 210b, lists of devices 220b, communication patterns 230b, and sensors 240b; and device 200n includes an authentication system 210n, lists of devices 220n, communication patterns 230n, and sensors 240n.

With embodiments, the devices 200a, 200b . . . 200n may be, for example, computing systems, smart phones, smart televisions (that have computing power and can connect to networks, such as the internet) or items that include the device. Items that may include a device 200a, 200b . . . 200n include, for example: clothing, shoes, smart home devices (e.g., appliances (refrigerators, washers, dryers, etc.), thermostats, lights, televisions, etc.), heart monitoring implants or other implants, transponders, automobiles, buildings, industrial process control, supply chain management, transportation systems (such as railways, airplanes, and buses), etc.

Embodiments are based on the concept of a social media platform for devices. With embodiments, the authentication system 110 makes trusted device and untrusted device decisions based on multilayer determinations.

The following are example lists of friend devices:
device A—list of friend devices includes device B
device B—list of friend devices includes device A and device C
device C—list of friend devices includes device B In the above example, device C is a friend of a friend device for device A.

Figure 3:
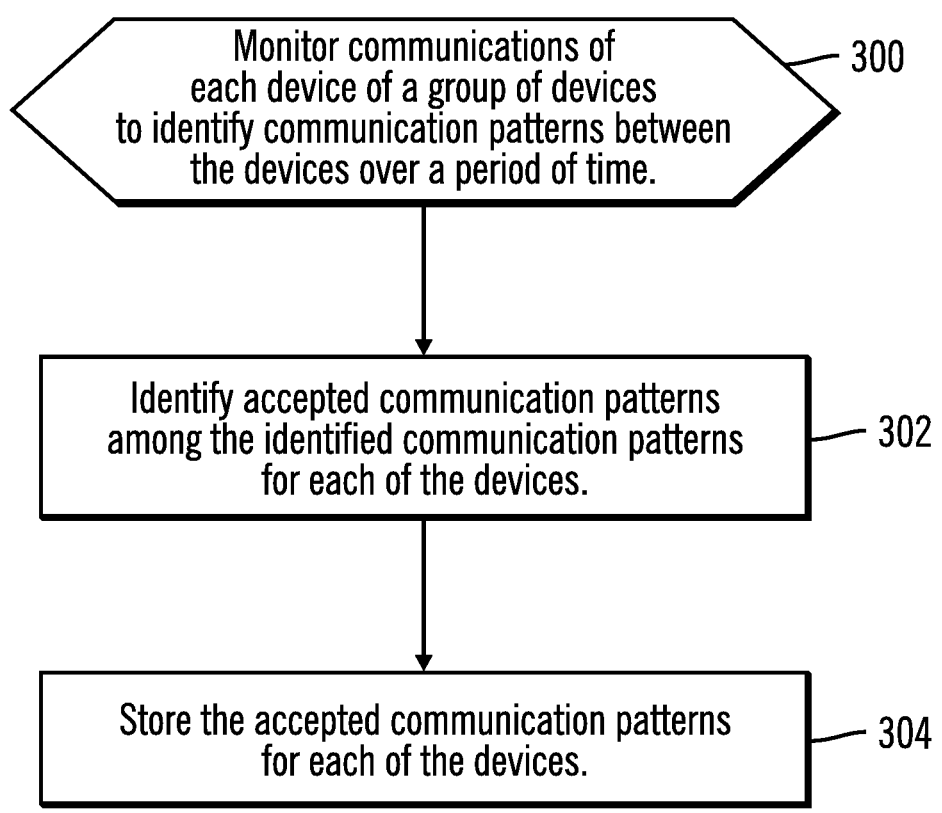
FIG. 3 illustrates, in a flow chart, operations for determining communication patterns in accordance with certain embodiments.

FIG. 3 illustrates, in a flow chart, operations for determining communication patterns in accordance with certain embodiments. Control begins in block 300 with the authentication system 110 monitoring communications of each device of a group of devices to identify communication patterns between the devices over a period of time. The group of devices may be a group of IoT devices. The monitoring may be done periodically or continuously. Identifying the communication patterns includes learning of new communication patterns between the devices. In block 302, the authentication system 110 identifies accepted communication patterns among the identified communication patterns for each of the devices. For example, if there are 100 communication patterns identified, the authentication system 110 may determine that some subset, such as 20 communications, are accepted communication patterns. The accepted communication patterns may be identified based on various factors, such as a total number of communication patterns to store for each of the devices, how frequently the communication pattern occurs, whether the communication patterns are between friend devices or foe devices, topology, how many of the features of the communications are found to match, etc.

In block 304, the authentication system 110 stores the accepted communication patterns for each of the devices. With embodiments, the accepted communication patterns are stored in a secure manner to understand the accepted (normal) modes of communication between devices.

In certain embodiments, each authentication system 110 of each of a group of devices performs the operations of FIG. 3 to monitor its communications with other devices. While in other embodiments, one authentication system 110 is selected to perform the operations of FIG. 3 to monitor communications among the devices in the group of devices, and the accepted communication patterns may be accessed by each device in the group of devices. With embodiments, the communication patterns are identified over a certain period of time. For example, each device may study and monitor the communications of other devices over that period of time to identify communication patterns. Each pattern can be also associated with a time window, which may specify how long it would be before one can confirm that the pattern is matching or not.

Figure 4:
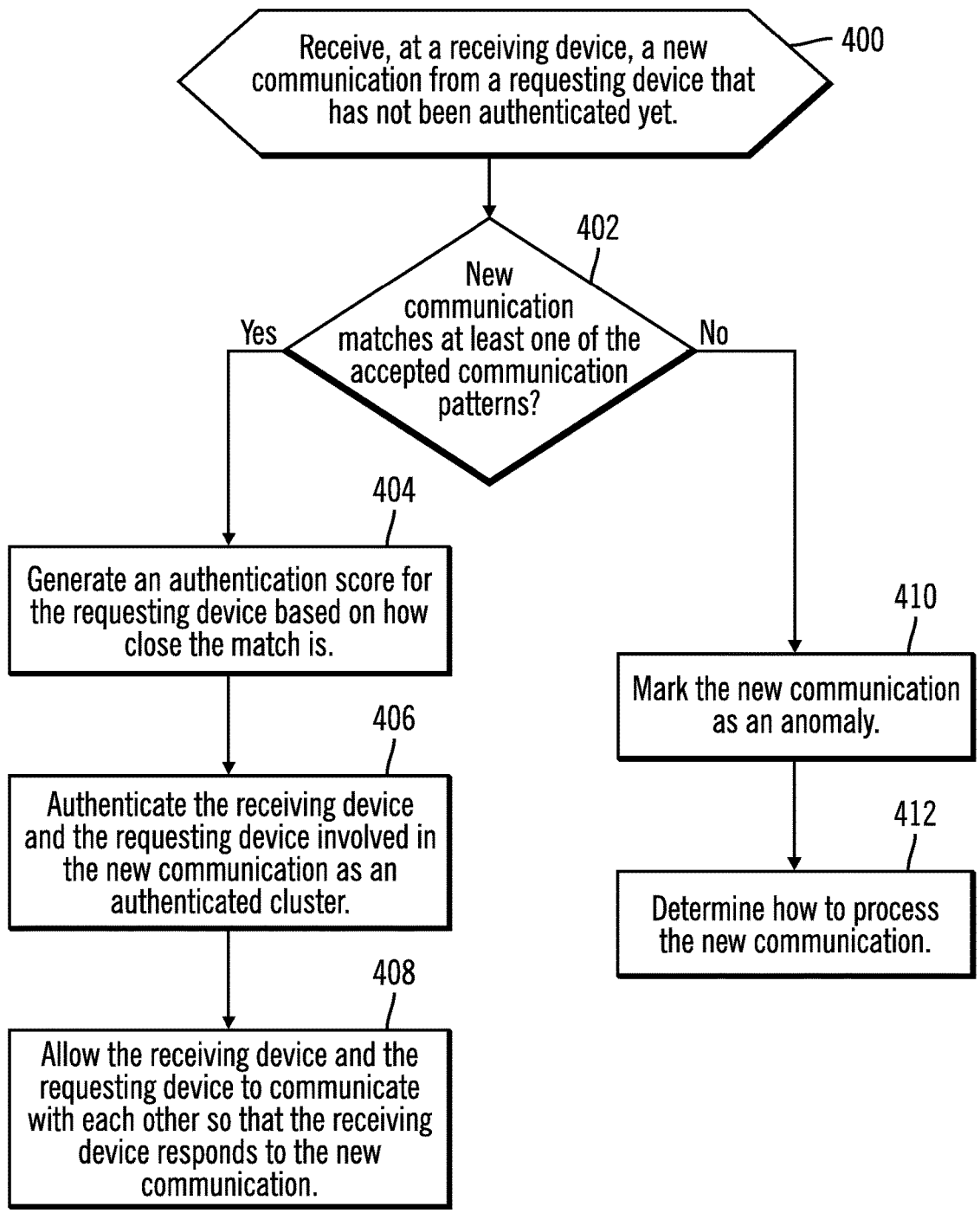
FIG. 4 illustrates, in a flow chart, operations for determining whether to provide access to a requesting device based on communication patterns in accordance with certain embodiments.

FIG. 4 illustrates, in a flow chart, operations for determining whether to provide access to a requesting device based on communication patterns in accordance with certain embodiments. Control begins at block 400 with the authentication system 110, at a receiving device, receiving a new communication from a requesting device that has not been authenticated yet. With embodiments, the requesting device may be in a group of devices (e.g., a group of IoT devices) that also includes the receiving device or may be an unknown device.

In block 402, the authentication system 110 determines whether the new communication matches at least one of the accepted communication patterns that has been previously stored. If there is a match, processing continues to block 404, otherwise, processing continues to block 410. With embodiments, the match may be a partial match (e.g., some parts of the communication matches an accepted communication pattern).

With embodiments, the matching matches the new communication to a portion of an accepted communication pattern that was previously identified and stored. For example, if the new communication is from Device X to Device A, at time T1, with a request for data from Device A, and the accepted communication patterns do not include such a communication, then there is no match. However, if the accepted communication patterns include a similar communication (e.g., a communication pattern from Device X to Device A, at time T1 every day, with a request for data from Device A, there is a match.

In block 404, the authentication system 110 generates an authentication score for the requesting device based on how close the match is. In block 406, the authentication system 110 authenticates the receiving device and the requesting device involved in the new communication as an authenticated cluster. In block 408, the authentication system 110 allows the receiving device and the requesting device that are authenticated to communicate with each other so that the receiving device responds to the new communication.

In block 410, the authentication system 110 marks the new communication as an anomaly (i.e., a mismatch). With embodiments, any communication that is substantially different from any of the accepted communication patterns is flagged as an anomaly.

In block 412, the authentication system 110 determines how to process the new communication. In certain embodiments, the authentication system 110 does not allow the devices that are involved in the new communication to communicate with each other. In other embodiments, the authentication system 110 may determine that the new communication is to be ignored, that the requesting device is to be identified as an "outcast" (i.e., the device notifies other devices not to trust the outcast device), that the requesting device is to be cut it off from the network, etc.

With embodiments, the authentication system 110 computes the authentication score between communication patterns based on comparing features and determining differences of the features of the communication patterns. For example, if one or more of the features is missing or has a null value, the authentication system 110 flags a mismatch. In certain embodiments, the authentication system 110 associates values for each of the differences (e.g., a difference in one feature may have a different value than a difference of another feature that may be deemed more or less important to the communication patterns), and the values are used to compute (e.g., squared and summed up) the authentication score (i.e., a total differences score) If the authentication score exceeds a threshold, then the authentication system 110 deems the communication patterns to be substantially different (i.e., the total differences exceed an acceptable threshold).

Thus, the authentication system 110 identifies communication patterns between devices. Clusters of devices are authenticated and stored. With embodiments, any anomalies or communications not fitting accepted communication patterns are considered as suspect and ignored.

As clusters of devices evolve and change, historical data is updated and stored. Patterns of communication normally change and evolve. More devices may be brought into the system and the topology of the communication might change. As communication patterns change over time, the newest communication pattern becomes the nominal, and authentication scores are computed from the nominal communication pattern. The historical data includes the older communication patterns and indicates changes to the system (e.g., a change in the number of devices over time).

Figure 5:
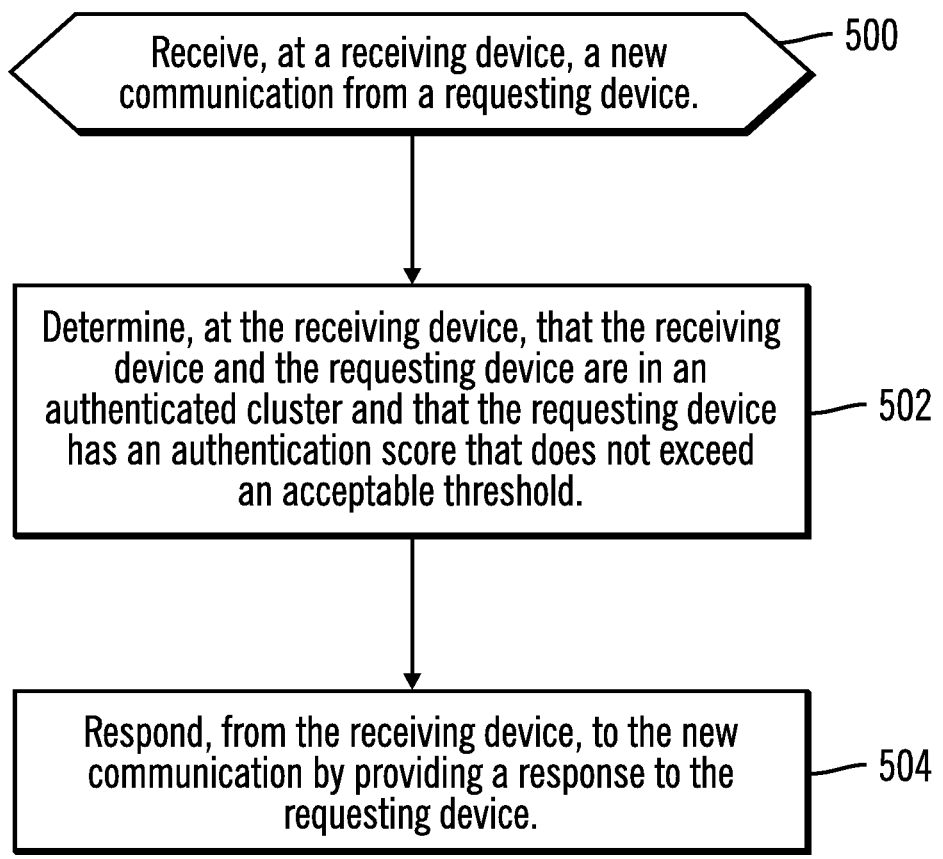
FIG. 5 illustrates, in a flow chart, operations for determining whether to provide access to requesting device based on an authenticated cluster in accordance with certain embodiments.

FIG. 5 illustrates, in a flow chart, operations for determining whether to provide access to requesting device based on an authenticated cluster in accordance with certain embodiments. Control begins at block 500 with the authentication system 110 receiving, at a receiving device, a new communication from a requesting device. In bock 502, the authentication system 110 determines, at the receiving device, that the receiving device and the requesting device are in an authenticated cluster and that the requesting device has an authentication score that does not exceed an acceptable threshold (i.e., the total differences do not exceed an acceptable threshold). With embodiments, the authentication score is computed based on the communication pattern. In block 504, the authentication system 110 responds, from the receiving device, to the new communication by providing a response to the requesting device.

Connected graphs describe a topology (e.g., devices connected in a circle, chain, Y formation, wheel, star, etc.). For example, a connected graph describes which devices are communicating with which other devices. In the connected graph, each of the devices is a node, while communications between the devices are a link between the devices.

Figure 6:
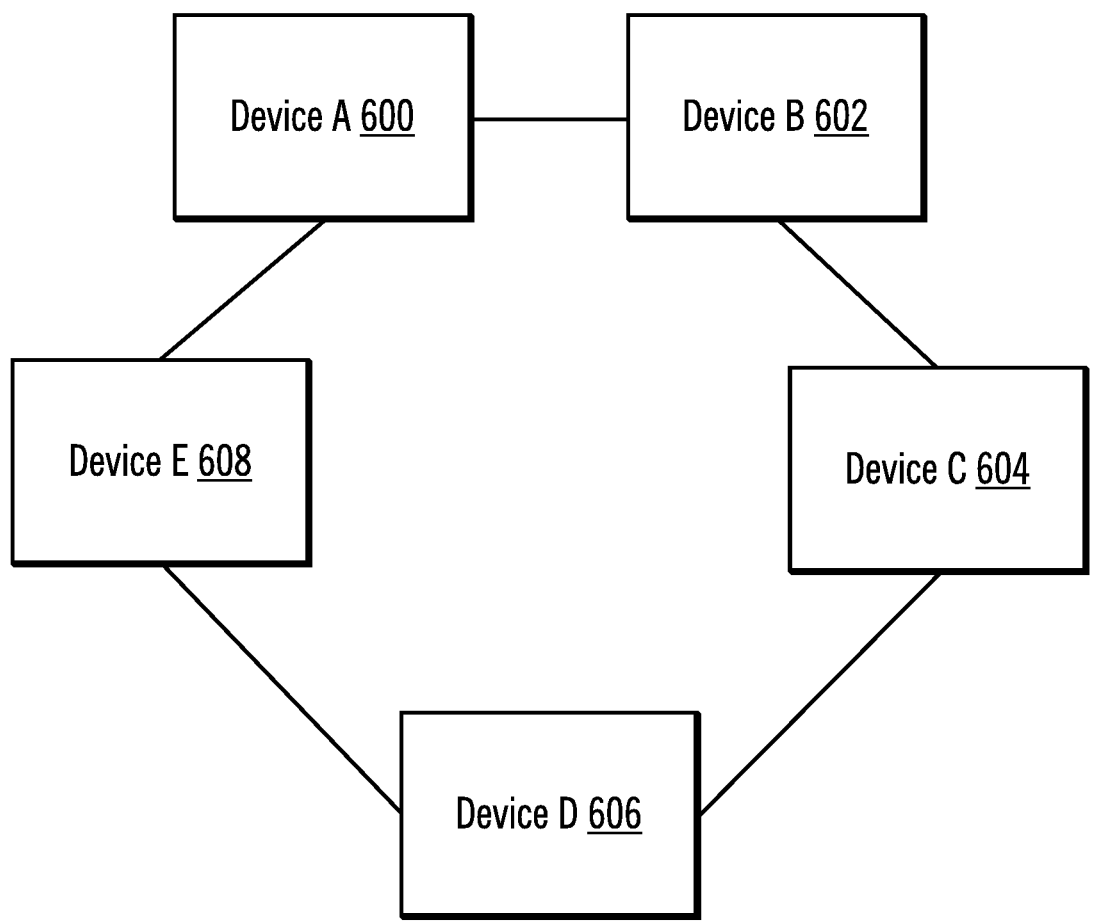
FIG. 6 illustrates a connected graph with a circle topology in accordance with certain embodiments.

FIG. 6 illustrates a connected graph with a circle topology in accordance with certain embodiments. Each device 600, 602, 604, 606, 608 communicates with devices that it is linked to. For example, device A 600 communicates with device B 602 and device E 608.

In certain embodiments, the authentication system 110 creates connected graphs and its evolution in a multi-dimensional scale. With embodiments, the authentication system 110 creates a connected communication graph to represent the communication between authenticated clusters with a time dimension.

A communication graph is the graph of communication at any current instance. A connected communication graph describes communication graphs that are connected in the time domain. With embodiments, a connected graph is a three dimensional semantic graph that connects communication graphs where time is one dimension and the connections between communicating clusters are stored as evolving semantic graphs. The connection graph is a mapping or a function of mixed (both continuous and discrete) domains.

Other dimensions may be added based on the context, such as weather, location and other factors that impact the communication. In multi-dimensions, as in a case of two dimensions, groups of devices are created as an evolving semantic graph in multi-dimensions. With embodiments, groups may be formed based on factors, such as weather and location, rather than on friend, foe, etc.

The authentication system 110 solves the problem of over dimensionality by choosing weights for each dimension and neglecting dimensions whose weights are below a threshold. With embodiments, the weights are determined based on a cognitive technique (e.g., to decide the best technique to select a friend from a foe.

In another variation of embodiments, the nature of a request, read or write, is a feature for determining a communication pattern and is taken into account for determining access to a device.

In additional embodiments, the clusters of devices may define a set of anti-dimension communication patterns. An anti-dimension communication pattern may specify a group of N dimensions in which the devices are forbidden in communicating together. For example, if a device is talking to a government application in a first country, that device should not also communicate with a government application in a second country. Such anti-dimension communication patterns may degrade the authentication score of devices for further involvement in the cluster.

Other forbidden dimensions may be learned over time. Any dimensions that are not used may eventually be classified as forbidden dimensions. This simplifies the computational dimensionality of having many dimensions.

In further embodiments, the authentication system 110, for situations in which device security is relevant, receives a security token (e.g., an authentication token, digital certificate or other security token). It is possible that some device may be taken over by a malicious entity or its identity may be stolen by a malicious entity. Then, if that device increases or decreases the kind, volume and frequency of data it sends (e.g., too much data or too little data, too fast or too slow), then this change in communication pattern may signal an anomaly. Also, if a device receives the same security token from two different places (i.e., different contextual information, such as different Media Access Control (MAC) addresses, then the device may determine that someone stole the security token and is masquerading as another device.

These communication changes may be in addition to which device is communicating. The device may still communicate with the same group of devices (e.g., in a friend circle) but the device may start noticing that one or more of the devices has been compromised.

In yet further embodiments, a connected device may try reconnecting to a cluster too fast and continue to perform this over a period of time. This communication pattern may suggest that the device has gone rogue and is performing session take over too frequently. Communication patterns like this may lead to identification of an anomaly and degrade the authentication score of the device for further involvement in the IoT cluster.

In yet additional embodiments, the authentication system 110 may be able to identify infected (or compromised) devices from a signature. The signature in this case may be made up of abnormal communication patterns and peculiar communication identifiers and/or content.

Thus, embodiments deny access to known devices by an unauthenticated, unknown to avoid unauthorized access of data, system to system failure, takeover by malicious intruders, etc.

Figure 7:
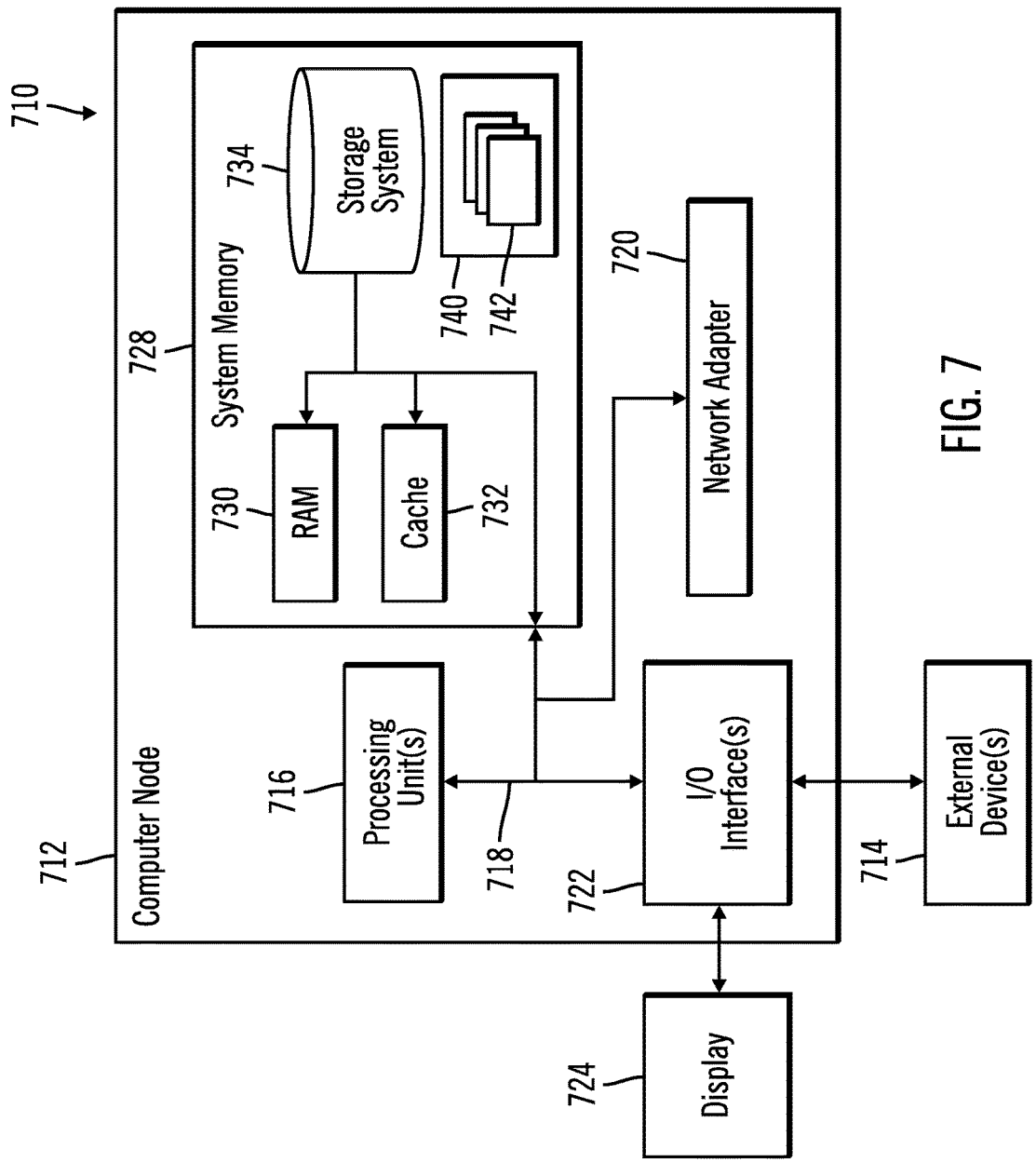
FIG. 7 illustrates a computing node in accordance with certain embodiments.

FIG. 7 illustrates a computing environment 710 in accordance with certain embodiments. In certain embodiments, the computing environment is a cloud computing environment. Referring to FIG. 7, computer node 712 is only one example of a suitable computing node and is not intended to suggest any limitation as to the scope of use or functionality of embodiments of the invention described herein. Regardless, computer node 712 is capable of being implemented and/or performing any of the functionality set forth hereinabove.

The computer node 712 may be a computer system, which is operational with numerous other general purpose or special purpose computing system environments or configurations. Examples of well-known computing systems, environments, and/or configurations that may be suitable for use with computer node 712 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 712 may be described in the general context of computer system executable instructions, such as program modules, being executed by a computer system. Generally, program modules may include routines, programs, objects, components, logic, data structures, and so on that perform particular tasks or implement particular abstract data types. Computer node 712 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer node 712 is shown in the form of a general-purpose computing device. The components of computer node 712 may include, but are not limited to, one or more processors or processing units 716, a system memory 728, and a bus 718 that couples various system components including system memory 728 to one or more processors or processing units 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 712 typically includes a variety of computer system readable media. Such media may be any available media that is accessible by computer node 712, and it includes both volatile and non-volatile media, removable and non-removable media.

System memory 728 can include computer system readable media in the form of volatile memory, such as random access memory (RAM) 730 and/or cache memory 732. Computer node 712 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, system memory 728 may include at least one program product having a set (e.g., at least one) of program modules that are configured to carry out the functions of embodiments of the invention.

Program/utility 740, having a set (at least one) of program modules 742, may be stored in system memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein.

Computer node 712 may also communicate with one or more external devices 714 such as a keyboard, a pointing device, a display 724, etc.; one or more devices that enable a user to interact with computer node 712; and/or any devices (e.g., network card, modem, etc.) that enable computer node 712 to communicate with one or more other computing devices. Such communication can occur via Input/Output (I/O) interfaces 722. Still yet, computer node 712 can communicate with one or more networks such as a local area network (LAN), a general wide area network (WAN), and/or a public network (e.g., the Internet) via network adapter 720. As depicted, network adapter 720 communicates with the other components of computer node 712 via bus 718. It should be understood that although not shown, other hardware and/or software components could be used in conjunction with computer node 712. Examples, include, but are not limited to: microcode, device drivers, redundant processing units, external disk drive arrays, RAID systems, tape drives, and data archival storage systems, etc.

In certain embodiments, the device 100 has the architecture of computer node 712. In certain embodiments, the device 100 is part of a cloud infrastructure. In certain alternative embodiments, the device 100 is not part of a cloud infrastructure.

Cloud Embodiments

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
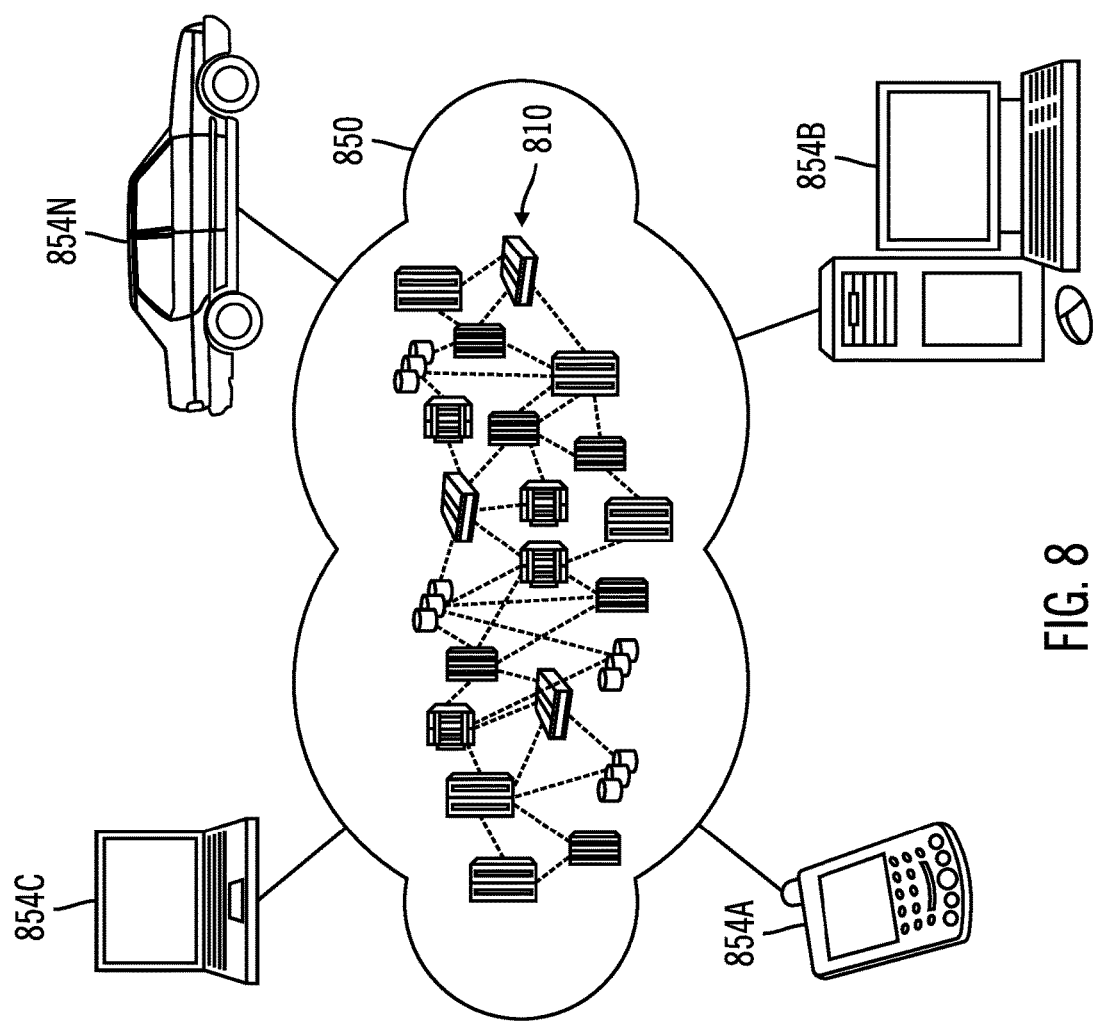
FIG. 8 illustrates a cloud computing environment according to an embodiment of the present invention.

Referring now to FIG. 8, illustrative cloud computing environment 850 is depicted. As shown, cloud computing environment 850 includes one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
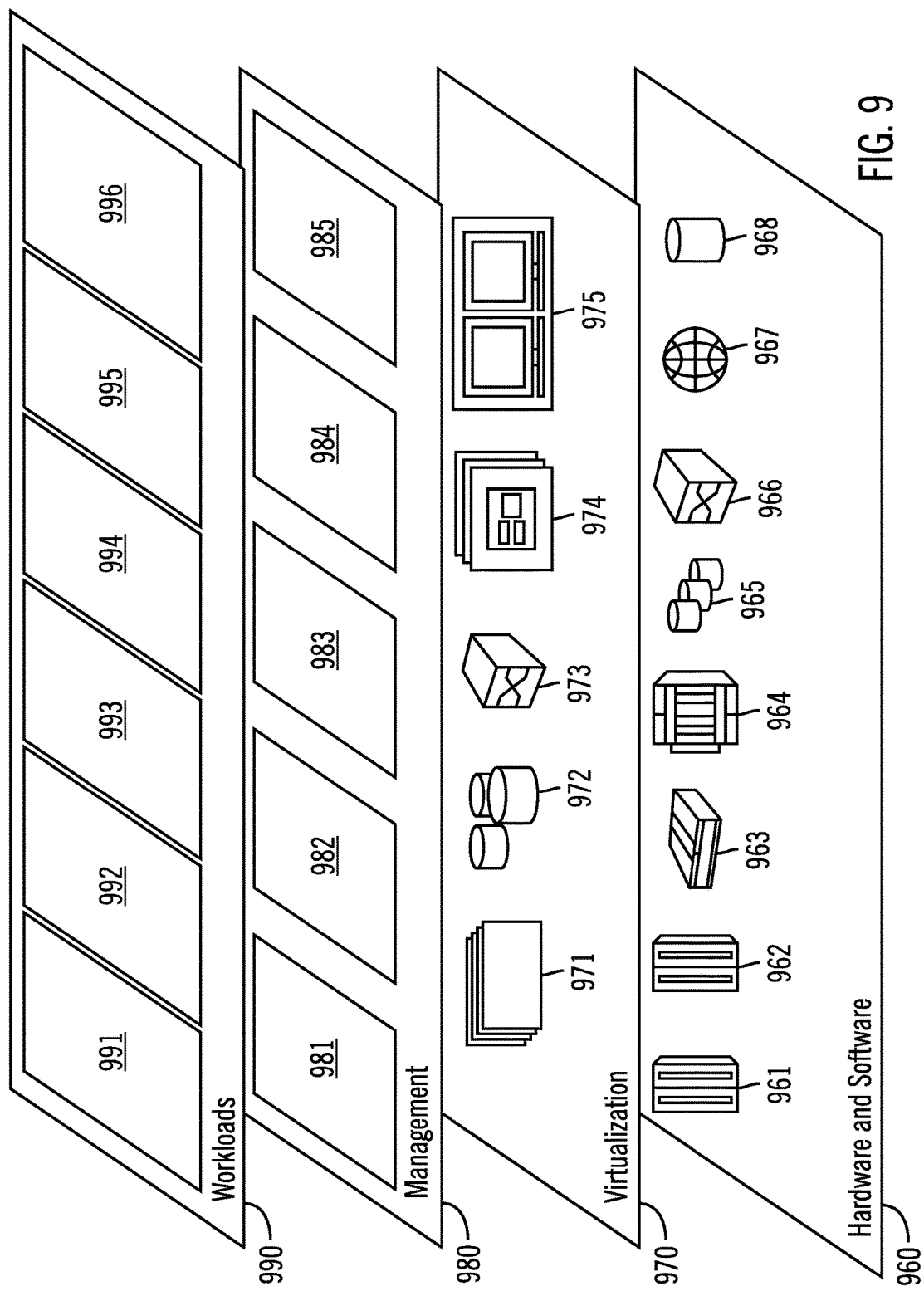
FIG. 9 illustrates abstraction model layers according to an embodiment of the present invention.

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and authenticating a device based on communication patterns 996.

Thus, in certain embodiments, software or a program, implementing authenticating a device based on communication patterns in accordance with embodiments described herein, is provided as a service in a cloud environment.

ADDITIONAL EMBODIMENT DETAILS

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for authentication, comprising operations for:
   storing accepted communication patterns representing accepted modes of communication between devices in an internet of things network, wherein each of the accepted communication patterns includes one or more features, wherein each of the accepted communication patterns includes one or more features, and wherein each of the one or more features describes which of the devices are communicating, a type of a communication, when the devices are communicating, a duration of the communication, and a frequency of the communication;
   in response to receiving a first communication from a requesting device of the devices,
      determining whether the first communication matches a communication pattern of the accepted communication patterns;
      in response to determining that the first communication matches the communication pattern,
         generating an authentication score for the requesting device based on how closely the first communication matches with the communication pattern; and
         responding to the first communication; and
      in response to determining that the first communication does not match the communication pattern, flagging the first communication as an anomaly; and
   in response to receiving a second communication from the requesting device,
      determining whether the authentication score of the requesting device exceeds a threshold; and
      in response to determining that the requesting device has the authentication score that exceeds the threshold, responding to the second communication.

2. The computer-implemented method of claim 1, further comprising operations for:
   creating a connected communication graph to represent communications between authenticated clusters with a time dimension.

3. The computer-implemented method of claim 1, further comprising operations for:
   storing anti-communication communication patterns that indicate which devices are blocked from communicating with each other.

4. The computer-implemented method of claim 1, further comprising operations for:
   determining that a selected device from the devices has been compromised based on at least one of the selected device has changed a kind, a volume, and a frequency of data that the selected device sends.

5. The computer-implemented method of claim 1, further comprising operations for:
   determining that a selected device from the devices has been compromised based on receiving a same security token from the selected device and from another device.

6. The computer-implemented method of claim 1, further comprising operations for:
   identifying a new communication pattern of a device from the devices trying to continuously reconnect over a period of time, wherein the new communication pattern indicates that the device has gone rogue.

7. The computer-implemented method of claim 1, further comprising operations for:
   identifying an infected device from the devices based on a signature of the infected device that comprises an abnormal communication pattern.

8. The computer-implemented method of claim 1, wherein a Software as a Service (SaaS) is configured to perform the operations of the computer-implemented method.

9. A computer program product, the computer program product comprising a computer readable storage medium having program code embodied therewith, the program code executable by at least one processor to perform operations for:
   storing accepted communication patterns representing accepted modes of communication between devices in an internet of things network, wherein each of the accepted communication patterns includes one or more features, wherein each of the accepted communication patterns includes one or more features, and wherein each of the one or more features describes which of the devices are communicating, a type of a communication, when the devices are communicating, a duration of the communication, and a frequency of the communication;
in response to receiving a first communication from a requesting device of the devices,
    determining whether the first communication matches a communication pattern of the accepted communication patterns;
    in response to determining that the first communication matches the communication pattern,
        generating an authentication score for the requesting device based on how closely the first communication matches with the communication pattern; and
        responding to the first communication; and
    in response to determining that the first communication does not match the communication pattern, flagging the first communication as an anomaly; and
in response to receiving a second communication from the requesting device,
    determining whether the authentication score of the requesting device exceeds a threshold; and
    in response to determining that the requesting device has the authentication score that exceeds the threshold, responding to the second communication.

10. The computer program product of claim 9, wherein the program code is executable by at least one processor to perform further operations for:
creating a connected communication graph to represent communications between authenticated clusters with a time dimension.

11. The computer program product of claim 9, wherein a Software as a Service (SaaS) is configured to perform the operations of the computer program product.

12. The computer program product of claim 9, wherein the program code is executable by at least one processor to perform further operations for:
storing anti-communication communication patterns that indicate which devices are blocked from communicating with each other.

13. The computer program product of claim 9, wherein the program code is executable by at least one processor to perform further operations for:
determining that a selected device from the devices has been compromised based on at least one of the selected device has changed a kind, a volume, and a frequency of data that the selected device sends.

14. The computer program product of claim 9, wherein the program code is executable by at least one processor to perform further operations for:
determining that a selected device from the devices has been compromised based on receiving a same security token from the selected device and from another device.

15. A computer system, comprising:
one or more processors, one or more computer-readable memories and one or more computer-readable, tangible storage devices; and
program instructions, stored on at least one of the one or more computer-readable, tangible storage devices for execution by at least one of the one or more processors via at least one of the one or more memories, to perform operations comprising:
storing accepted communication patterns representing accepted modes of communication between devices in an internet of things network, wherein each of the accepted communication patterns includes one or more features, wherein each of the accepted communication patterns includes one or more features, and wherein each of the one or more features describes which of the devices are communicating, a type of a communication, when the devices are communicating, a duration of the communication, and a frequency of the communication;
in response to receiving a first communication from a requesting device of the devices,
    determining whether the first communication matches a communication pattern of the accepted communication patterns;
    in response to determining that the first communication matches the communication pattern,
        generating an authentication score for the requesting device based on how closely the first communication matches with the communication pattern; and
        responding to the first communication; and
    in response to determining that the first communication does not match the communication pattern, flagging the first communication as an anomaly; and
in response to receiving a second communication from the requesting device,
    determining whether the authentication score of the requesting device exceeds a threshold; and
    in response to determining that the requesting device has the authentication score that exceeds the threshold, responding to the second communication.

16. The computer system of claim 15, wherein the operations further comprise:
creating a connected communication graph to represent communications between authenticated clusters with a time dimension.

17. The computer system of claim 15, wherein a Software as a Service (SaaS) is configured to perform the operations of the computer system.

18. The computer system of claim 15, wherein the operations further comprise:
storing anti-communication communication patterns that indicate which devices are blocked from communicating with each other.

19. The computer system of claim 15, wherein the operations further comprise:
determining that a selected device from the devices has been compromised based on at least one of the selected device has changed a kind, a volume, and a frequency of data that the selected device sends.

20. The computer system of claim 15, wherein the operations further comprise:
determining that a selected device from the devices has been compromised based on receiving a same security token from the selected device and from another device.

* * * * *